United States Patent [19]

Mowry, Jr. et al.

[11] 4,341,404
[45] Jul. 27, 1982

[54] SECURITY DOCUMENT USING A VARIABLE DOT SCREEN

[75] Inventors: William H. Mowry, Jr., Ionia, N.Y.; Kathleen M. Gerew, Spartanburg, S.C.

[73] Assignee: Burroughs Corporation, Detroit, Mich.

[21] Appl. No.: 120,624

[22] Filed: Feb. 11, 1980

[51] Int. Cl.$^3$ .............................................. B42D 15/00
[52] U.S. Cl. ......................................... 283/8 B; 283/6
[58] Field of Search ..................... 283/7, 8 A, 8 B, 6, 283/9

[56] References Cited

U.S. PATENT DOCUMENTS

| | | | |
|---|---|---|---|
| 3,802,724 | 4/1974 | Gosnell | 283/9 R |
| 4,175,774 | 11/1979 | Tonges | 283/6 |
| 4,210,346 | 7/1980 | Mowry, Jr. | 283/8 B |
| 4,227,719 | 10/1980 | McElligott | 283/8 R |
| 4,227,720 | 10/1980 | Mowry, Jr. | 283/8 R |
| 4,265,469 | 5/1981 | Mowry, Jr. | 283/8 B |

Primary Examiner—Paul A. Bell
Assistant Examiner—John S. Brown
Attorney, Agent, or Firm—David G. Rasmussen; Kevin R. Peterson

[57] ABSTRACT

An improved copy-proof document is disclosed having a cancellation phrase and a background pattern each printed of a plurality of elements of a geometric shape having one or more smaller uncovered areas within said geometrically shaped element.

14 Claims, 13 Drawing Figures

CONCENTRIC CIRCLES

SQUARE

LINE

LINE PAIR

CROSS

SECURITY DOCUMENT USING A VARIABLE DOT SCREEN

RELATED APPLICATIONS

This application relates to similar subject matter as that contained in the following U.S. patents and commonly assigned U.S. patent application:
1. U.S. Pat. No. 4,168,068
2. U.S. Pat. No. 4,265,469
3. U.S. Pat. No. 4,210,346
4. Application Ser. No. 83,763, filed Oct. 11, 1979.

The entire contents of each of the above patents and application is hereby incorporated herein by this reference.

BACKGROUND OF THE INVENTION

In the past, as illustrated in the above U.S. patent and applications, conventional copy-proof documents were comprised of a single tone cancellation phrase ("VOID", "COPY", etc.) and a single tone background pattern. Tone, in this context, refers to the dots or marks which cover a percentage of the printed area and have a frequency measured in dots, marks or lines per inch. The cancellation phrase was composed of a tone slightly larger in percentage, but significantly lower in frequency than the background tone.

Many different combinations were possible. For example, the cancellation phrase or void word could cover 22% (printed dot diameter of approximately 0.010 inches) with a frequency of 65 lines per inch. The background pattern in this instance could be 16% (printed dot diameter of approximately 0.005 inches) with a frequency of 133 lines per inch. Another example might use the same frequencies, but a void word composed of 15% (printed dot diameter of 0.008 inches) and a background of 10% (printed dot diameter of 0.003 inches).

The above techniques were successful and for properly printed documents the protection was excellent for normal settings of copiers such as the Xerox L-6500 color copier or similar equipment. However, protection was less than adequate for a full range of copier settings. At the lighter settings the resolution of the copier is such that it does not see the smaller background dots nor can it reproduce the larger dots that comprise the cancellation phrase. If the dot sizes are adjusted so that the cancellation phrase is visible at the lighter copier settings but not visible on the printed document, the background pattern becomes visible to the copier at darker settings. When this occurs the background pattern tends to obscure the cancellation phrase pattern.

The aesthetic quality of these documents is limited by three inherent weaknesses. First, the ability of screened tones to print detailed patterns. To fully reproduce a pattern with a screen tint, the pattern must be at least two line widths at its narrowest points. A 133 lines per inch tint can then carry print down to 0.0150 inches. The customary screen paired with it is a 65 line per inch tint. It can reproduce detail to only 0.030 inches. One can conclude that the quality of detail in a printed manuscript is limited by the size of the largest dots.

Secondly, the questionable accuracy in the frequency of screen tints can cause problems at the boundary between the cancellation phrase and the background. The most successful screen pair thus far has been the 65 and 133 lines per inch combination. As one can see, these are not exact multiples. Also, they are production quality screens and are at best accurate to ±1.5 lines per inch for the 65 lines per inch tint and ±3.0 lines per inch for the 133 lines per inch tint. This mismatch (as opposed to exact multiples) in frequency causes interference patterns at the boundaries. This is analogous to playing a chord on an out-of-tune piano; just as the tonal inaccuracies are audible, so are the boundaries visible.

Finally, even if the frequencies are matched as exact multiples (i.e. 65 and 130 lines per inch) the transition is still not hidden from the human perception. This can again be illustrated by a musical analogy. If we were to play a note on a piano, then play the same note but a step higher (a multiple of the original frequency) the transition is smooth. But even someone who is tone deaf can distinguish between the two frequencies. If we use a camouflage screen made up of a random pattern, or a very bold pattern, it tends to obscure the difference. But for a pattern that is not bold or is fairly regular, the transition in frequency becomes more noticeable.

SUMMARY OF THE INVENTION

The document of the present invention is similar to earlier copy-proof systems in that it includes a document with a single tone background and a single tone cancellation phrase. However, the present invention provides a document which is protected over a much wider range of copier settings and with greater contrast between the cancellation phrase and the background tone by using dots of approximately 50% area coverage with smaller openings within the 50% dots.

It is therefore an object of this invention to provide an improved copy-proof document having a cancellation phrase which is more versatile than earlier systems in that the number of patterns and pantographs which may be applied to such documents will be increased.

It is a further object of the present invention to provide a copy-proof document which has a greater range of copy-proof protection since the cancellation phrase of this document will darken at darker copier settings of the copying machine.

It is a still further object of the present invention to provide a copy-proof document having greater aesthetic quality. That is, the print quality is improved by a less visible cancellation expression and the ability to reproduce fine detail.

These and other objects will become more apparent as each of the drawings is described in detail.

DESCRIPTION OF THE PREFERRED EMBODIMENT

Figure 1:
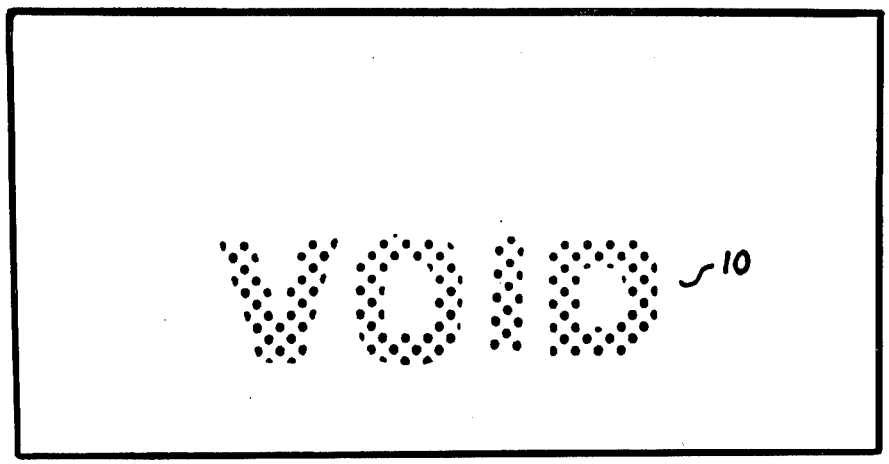
FIG. 1 illustrates an example of a copy-proof document showing the "VOID" mark as it appears on a copy of an original document.

With reference to the drawings, it must be appreciated that Patent Office requirements for solid black line drawings on a white surface make illustration of some of the subtleties of our invention relating to screen tones and color tones difficult by the required Patent Office drawings alone. Reference to the following detailed description of the illustration will make full appreciation of the drawings and our invention possible.

In the drawings we have used dots spaced nine to the lineal inch and eighteen to the lineal inch to represent a corresponding 65 lines to the inch and 130 lines to the inch which are actually used in our preferred embodiment. In this one preferred embodiment it will be found that this common multiple is best. However, as will be espoused below, it is possible to use other multiples.

In FIG. 1 the warning phrase 10, namely "VOID" is shown as a positive representation with dots included. This warning phrase 10 is prepared initially as a solid line image of the size represented by the dotted representation and photographed both in positive and in reverse line images. The solid line image can be prepared by conventional photocomposed master techniques. The dots are added in additional steps by conventional photomechanical techniques, namely by exposure with a screen dot image on film.

Figure 2:
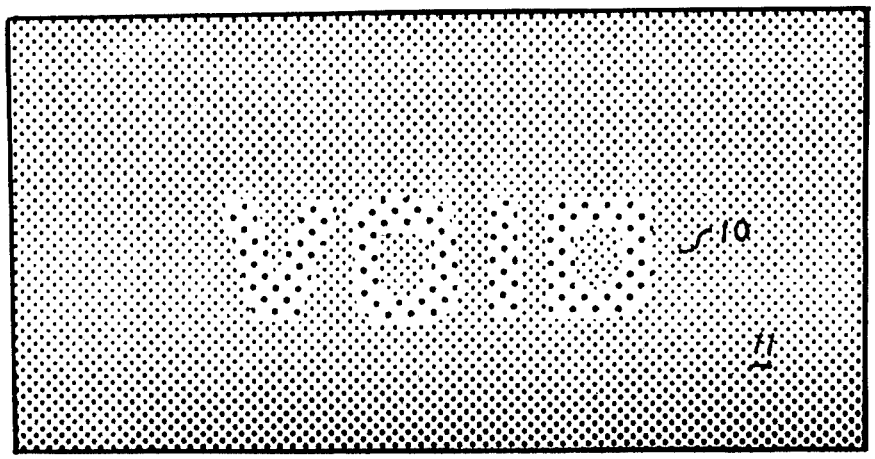
FIG. 2 illustrates the cancellation phrase dot pattern of a conventional dot pattern and a conventional background pattern.

As shown in FIG. 2, a composite negative including the warning phrase 10 surrounded by the smaller pitch background tone 11 is prepared so as to present the warning phrase 10 appearing within the smaller pitch background 11. In our preferred embodiment we would illustrate the word "VOID" in 65 pitch and a background in 130 pitch, the word "pitch" being understood to mean the number of lines per linear inch in both directions.

The background screen 11 is fitted over the cancellation or warning phrase 10 in noncumulative mode.

Figure 3:
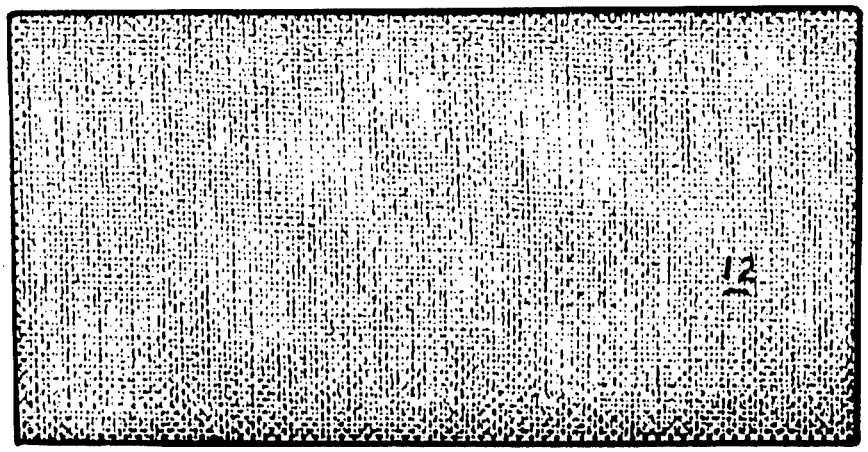
FIG. 3 illustrates the camouflage field used in the present invention.

As shown in FIG. 3 a camouflage pattern hiding the tones of FIG. 2 is included in the composite mask 12 of the tone pattern shown in FIG. 2 so as to mask the underlying tones and the cancellation phrase 10. This camouflage pattern mask 12 becomes a part of the master so that not even a critical observer can easily see the cancellation phrase beneath or as part of the camouflage. Here we should say that by the word "tone" we would prefer to exclude full tones and include half tones, screen tints and screen tones or other tones which have changing densities going across the boundary, whether made by conventional photomechanical techniques or by computer controlled patterns of various types.

Figure 4:
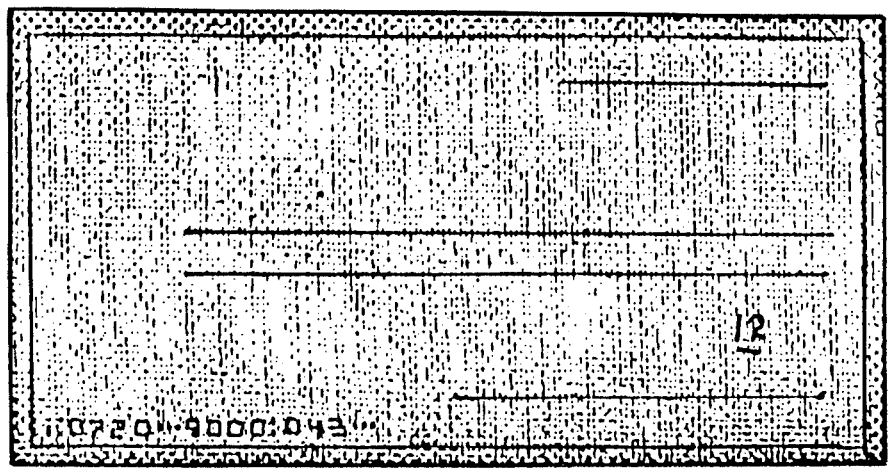
FIG. 4 illustrates an original check with the cancellation phrase and background pattern camouflaged by the camouflage field of FIG. 3.

As shown in FIG. 4 utilizing the mask prepared in accordance with FIGS. 1 through 3, the document can be printed on ordinary paper or on conventional safety paper as a check would be. It may be printed with ordinary ink as illustrated by the solid lines and with numerals as illustrated by the representation of the MICR code representing the bank involved.

In the preferred embodiment of the invention as illustrated in FIGS. 3 and 4, the pattern is printed on the surface of Burroughs (Registered Trademark) Safety Paper as will be described more fully below.

Figure 5:
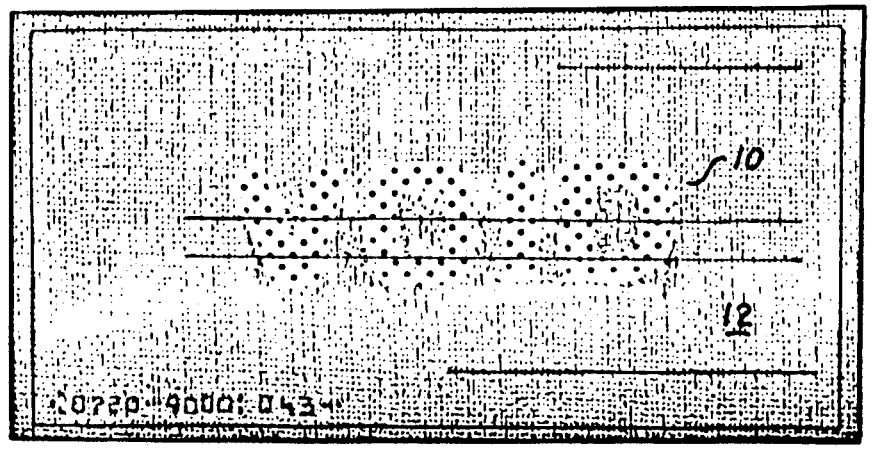
FIG. 5 is a copy of the check of FIG. 4 illustrating the cancellation phrase dominance in the copy.

As shown in FIG. 5, when the document of FIG. 4 is reproduced on a Xerox L-6500 copier, the warning phrase 10 appears on the copy in spite of the camouflage mask 12.

Figure 6A:
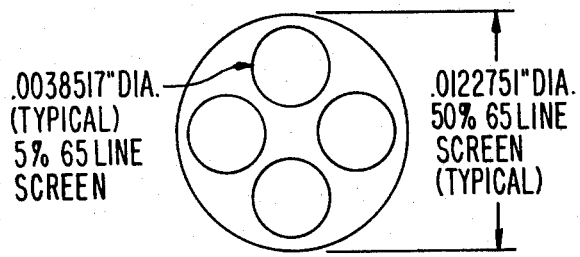
FIGS. 6A, 6B and 6C are detailed illustrations of the proposed dot screen of the present invention.
Figure 6B:
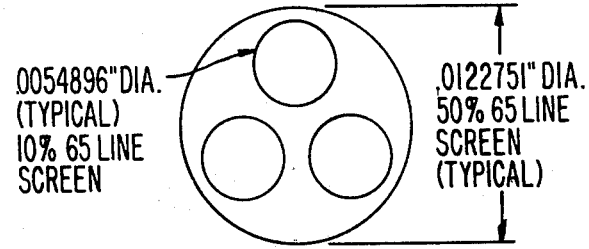
Figure 6C:
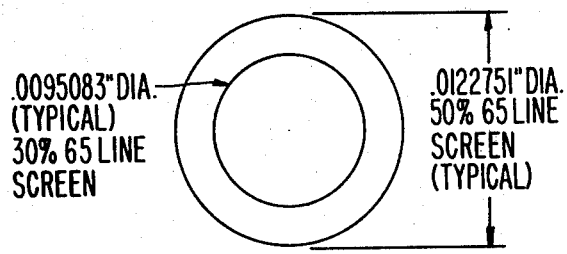
Figure 7A:
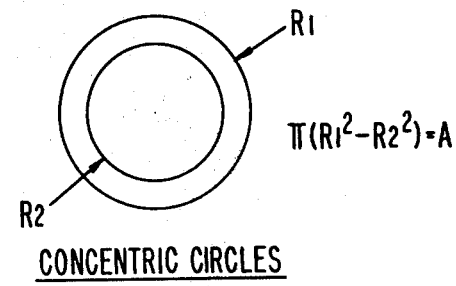
FIGS. 7A, 7B, 7C, 7D and 7E illustrate several alternative geometric shapes for the circular configuration shown in FIGS. 6A-6C.
Figure 7B:
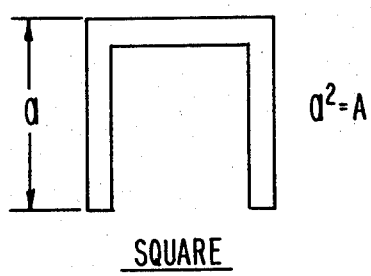
Figure 7C:
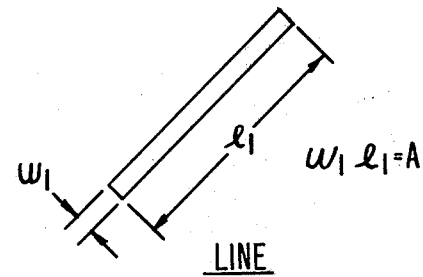
Figure 7D:
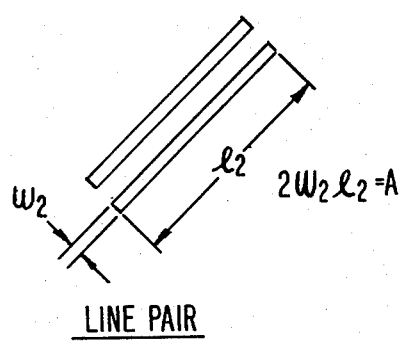
Figure 7E:
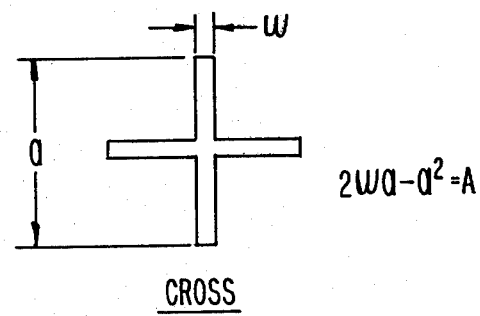

FIGS. 6A, 6B and 6C illustrate preferred embodiments of the present invention.

As in the prior patent and applications, the documents use a word such as "VOID" made by an array of dots of a single size and number per lineal inch. Typically we use 65 line per inch dots of about 0.010 diameter.

The word is surrounded by a background array of dots of a single size and number per inch. Typically we use 130 line per inch dots of about 0.005 diameter.

A camouflaging pattern negative is exposed with the composite word and background negative to give a pattern which obscures the density differences between the word and background as well as the joint line between the two different monotone screens so long as the differences are not too great.

The above combination was selected for best results at normal copier settings. However, at extreme settings—both darker and lighter—the background fills in or the word becomes too faint for good protection. This invention, therefore, relates to a document which is operable over a wider range of settings. We have made the following two discoveries which enable us to accomplish this. They are:

1. Dots must be about 50% area coverage to copy reliably at the lightest copier settings. With 65 line screens this implies a dot of approximately 0.012275 inches in diameter.

2. Area coverage greater than 50% produces holes of uncovered paper surrounded by printed ink.

A typical printing process will hold open holes as small as 0.003 inches in diameter. The copier fills holes as large as 0.006 diameter on the printed document.

Based on these discoveries, it is possible to make large dots (about 0.013 in diameter) with smaller dots (perhaps 0.005 in diameter) within the perimeter of the large dot. The printed dot which appears as a 50% area when solid appears as a much lighter area to the human eye because of the reduced coverage within the area of the large dot.

When we place four 5% holes (0.004 diameter) in the 50% dot, the visual appearance is about a 30% dot. When we place three 10% holes (0.0055 diameter) in the 50% dot, the visual appearance is approximately a 20% dot. There are many other possible combinations.

Further, the interior holes in the 50% dot will fill on the copies and greatly increase the contrast between word and background on the color copies.

The illustrations of FIGS. 6A, 6B and 6C also show that there is flexibility in adjusting the visual density and copying density by small changes in geometry of the printed image.

As in the past, the ability to adjust both word and background dot sizes remains essential. Both word and background dots change size in proportion to their perimeter. This phenomenon is described as "dot gain" in the printing industry. In its simplest form, small dots grow faster than large dots.

It is advantageous to have between 10 and 15 percentage points difference in area covered by background dots and the word dots with the background dots smaller than the word dots. The measurements are made on the composite word and background negative before addition of the camouflaging screen.

Further, alternate geometric configurations are illustrated in FIGS. 7A–7E along with their various corresponding areas.

Where the circular dots and holes are the preferred embodiment because these configurations minimize dot perimeter and thereby reduce the "dot gain" effects common on printing presses, many other elements are possible for varying one dot structure and will occur to those skilled in the art. It is therefore our intention that this invention be limited only by the full scope of the language of the following claims.

What is claimed is:

1. An improved security document comprising:
   a substrate having a top surface for carrying indicia;
   background printed matter on said top surface, said background printed matter made up of a pattern of background elements of substantially the same size and of a uniform frequency, said background elements not resolvable by a color copier; and,
   a cancellation term also printed on said top surface of said substrate, said cancellation term composed of a pattern of cancellation term elements, said cancellation term elements being resolvable by a color copier to show a visually preceptible cancellation term, each said cancellation term element being a geometrically shaped printed dot, each of said cancellation term elements having at least one unprinted area within said cancellation term element.

2. The improved security document as set forth in claim 1 wherein said cancellation term elements are of a lower frequency than said background elements.

3. The improved security document as set forth in claim 2 wherein each of said cancellation term elements is a circular printed dot having at least one smaller circular unprinted area within said larger circular printed dot.

4. The improved security document as set forth in claim 3 wherein each of said background elements is smaller than said cancellation term element.

5. The improved security document as set forth in claim 4 wherein each of said background elements is 10-15% smaller in area than said printed circular elements of said cancellation term.

6. The improved security document as set forth in claim 1 wherein a camouflage pattern is incorporated into said background printed pattern and said printed cancellation term.

7. The improved security document as set forth in claim 2 wherein said background elements and said cancellation term elements are of different geometric shapes.

8. An improved security document comprising:
   a substrate having a top surface for carrying indicia;
   a cancellation term printed on said top surface of said substrate, said cancellation term composed of cancellation term elements, said cancellation term elements not being resolvable by a color copier, each said cancellation term element being a geometrically shaped printed dot; and,
   background printed matter on said top surface, said background printed matter composed of a pattern of background elements, said background term elements being resolvable by a color copier to expose a visually preceptible cancellation term, each said background element being a geometrically shaped printed dot, each of said background elements having at least one unprinted area within said background element.

9. The improved security document as set forth in claim 8 wherein each of said background elements is a circular printed dot having at least one smaller circular unprinted area within said larger circular printed dot.

10. The improved security document as set forth in claim 9 wherein said cancellation term elements are of a lower frequency than said background elements.

11. The improved security document as set forth in claim 10 wherein each of said cancellation term elements is smaller than said background term elements.

12. The improved security document as set forth in claim 11 wherein each of said cancellation term element is 10-15% smaller in area than said printed circular elements of said background element.

13. The improved security document as set forth in claim 8 wherein a camouflage pattern is incorporated into said background printed pattern and said printed cancellation term.

14. The improved security document as set forth in claim 10 wherein said background elements and said cancellation term elements are of different geometric shapes.

* * * * *